United States Patent
Looijmans et al.

(10) Patent No.: US 7,683,559 B2
(45) Date of Patent: Mar. 23, 2010

(54) METHOD OF RECOVERING ENERGY FROM THE TURNTABLE MOTOR IN AN OPTICAL DISC DRIVE AND OPTICAL DEVICE

(75) Inventors: Hendrikus Albertus Johanna Looijmans, Eindhoven (NL); Cornelius Antonius Hezemans, Eindhoven (NL); Joop Van Bijnen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 227 days.

(21) Appl. No.: 11/995,353

(22) PCT Filed: Jul. 6, 2006

(86) PCT No.: PCT/IB2006/052270

§ 371 (c)(1),
(2), (4) Date: Jan. 11, 2008

(87) PCT Pub. No.: WO2007/010423

PCT Pub. Date: Jan. 25, 2007

(65) Prior Publication Data

US 2008/0218106 A1     Sep. 11, 2008

(30) Foreign Application Priority Data

Jul. 15, 2005    (EP)    .................. 05106509

(51) Int. Cl.
*H02P 3/14* (2006.01)

(52) U.S. Cl. .................. 318/376; 318/400.09; 369/264; 369/267; 369/268; 700/12; 700/22; 700/27

(58) Field of Classification Search .................. 318/376, 318/400.09; 369/264, 267, 268; 700/12, 700/22, 27
See application file for complete search history.

(56) References Cited

U.S. PATENT DOCUMENTS 5,223,771 A * 6/1993 Chari .................... 318/400.09

(Continued)

FOREIGN PATENT DOCUMENTS

JP    2003-189676    7/2003

(Continued)

OTHER PUBLICATIONS

Amfrews James: "A Motor Controller for Solar Car", A Thesis Report, University of Queensland, Australia, 1998.

(Continued)

*Primary Examiner*—Rita Leykin

(57) ABSTRACT

The present invention relates to a method of recovering energy from the turntable motor (12) in an optical disc drive comprising a power supply and a circuitry (10) that is capable of selectively feeding a current from the power supply into the motor in a first state and from the motor into the power supply in a second state, the method comprising the steps of: decelerating the motor, during decelerating the motor, repeatedly calculating a ratio between a duration of the first state and a duration of the second state in dependence on an angular velocity of the motor, such that a current integrated over the whole decelerating process is fed from the motor into the power supply, and after calculating the ratio, selecting the duration of the first state and the duration of the second state in accordance with the calculated ratio. The present invention further relates to an optical device.

10 Claims, 4 Drawing Sheets

U.S. PATENT DOCUMENTS

| | | | |
|---|---|---|---|
| 5,583,412 A | | 12/1996 | Nielsen |
| 5,834,913 A * | | 11/1998 | Yoshida et al. .............. 318/270 |
| 5,861,724 A * | | 1/1999 | Ackerson .................... 318/376 |
| 5,990,641 A | | 11/1999 | Van Buul et al. |
| 6,285,521 B1 * | | 9/2001 | Hussein ................... 360/73.03 |
| 6,611,658 B1 | | 8/2003 | Takahashi |
| 6,616,581 B2 * | | 9/2003 | Gwyn ....................... 482/139 |
| 2004/0057150 A1 | | 3/2004 | Odai et al. |

FOREIGN PATENT DOCUMENTS

WO               95/34070         12/1995

OTHER PUBLICATIONS

Roger C. Becerra et al: "Four-Quadrant Brushless ECM Drive With Integrated Current Regulation", IEEE Transactions on Industry Application, vol. 28, No. 4, 1992.

ISR/Written Opinion of the International Searching Authority PCT/IB2006052270.

\* cited by examiner

METHOD OF RECOVERING ENERGY FROM THE TURNTABLE MOTOR IN AN OPTICAL DISC DRIVE AND OPTICAL DEVICE

The present invention relates to a method of recovering energy from the turntable motor in an optical disc drive. The invention further relates to an optical device in which energy from the turntable motor can be recovered.

An optical drive needs to accelerate and decelerate the turntable motor and the disc that is clamped on the turntable in several situations during normal operation. It needs to accelerate, for example, when a new disc is placed in the drive that needs to be read or recorded, when the drive needs to restart after it has gone into a power saving mode, or when a seek is performed in a CLV (constant linear velocity) mode from an outside radius of the disc to a smaller radius. Also a decelerating occurs in similar situations: when stopping the disc to eject it, going to a power saving mode, or performing an outside seek in CLV mode.

In the situations that the turntable motor and the disc have to be decelerated, the kinetic energy of this system is reduced because after the deceleration, the motor is spinning at a lower frequency than before the deceleration.

In the currently applied methods according to prior art for decelerating the turntable motor of an optical drive, a net amount of energy is requested from the power supply that is either zero or greater than zero. This refers to the following known methods:

- Braking the motor with a fixed reversed voltage. Energy is dissipated because of friction and because current is fed through the internal resistance of the coil(s).
- Braking the motor by short circuiting its coil(s). Energy is dissipated because of friction, and because the motors back-EMF is resulting in a current through the coil resistance.
- Opening the coil(s) circuits so the motor and disc will decelerate by friction. Energy is dissipated because of friction only.

So although the kinetic energy of the motor and the disc is reduced and therefore energy is released, this energy is compensated or even exceeded by the amount of energy that is dissipated by friction and by driving the motor.

It is an object of the invention to provide a method and an optical device so that the amount of energy dissipated by friction and by driving of the motor is smaller than the released kinetic energy, resulting in a net energy remainder that can be used elsewhere in the system.

The above objects are solved by the features of the independent claims. Further developments and preferred embodiments of the invention are outlined in the dependent claims.

In accordance with the invention, there is provided a method of recovering energy from the turntable motor in an optical disc drive comprising a power supply and a circuitry that is capable of selectively feeding a current from the power supply into the motor in a first state and from the motor into the power supply in a second state, the method comprising the steps of:

decelerating the motor, during decelerating the motor, repeatedly calculating a ratio between a duration of the first state and a duration of the second state in dependence on an angular velocity of the motor, such that a current integrated over the whole decelerating process is fed from the motor into the power supply, and after calculating the ratio, selecting the duration of the first state and the duration of the second state in accordance with the calculated ratio.

This method can be implemented in the form of an algorithm on the basis of only little calculation effort. Therefore, the method can easily be implemented into existing systems.

Particularly, the ratio is defined as $\alpha/(1-\alpha)$ and an optimum value $\alpha_{opt}$ for $\alpha$ is calculated in accordance with the equation $$\alpha_{opt} = \frac{2V_{CC} + V_{EMF}}{4V_{CC}}$$

wherein $V_{CC}$ is the power supply voltage and $V_{EMF}$ is an electromagnetic force dependent voltage depending on the angular velocity $\omega_M$ of the motor and the motor constant $k_M$ in accordance with the equation $$V_{EMF} = k_M \omega_M.$$

Thus, in dependence on the actual value of $V_{EMF}$, $\alpha$ varies between an upper value, e.g. 0.85 and a lower value of 0.5 for $V_{EMF}=0$, hence $\omega_M=0$.

In practice, the duration of the first state and the duration of the second state is selected by selecting a corresponding pulse width modulation (PWM) signal that is applied to the motor. Thus, updating the voltage means updating $\alpha$. The voltage is applied to the motor as a PWM signal, so updating the voltage means that the duty cycle $\alpha$ of the pulses will change. In practice, changing the voltage or $\alpha$ is done by applying a different voltage to the input of a driver integrated circuit (IC). In general, the driver will be equipped with an electronic circuit that translates the voltage on the input pin to a PWM signal on the output stage. This PWM signal drives the motor.

According to a particular embodiment of the present invention, the steps of calculating and selecting are performed with a constant frequency over the whole deceleration process. The choice of a constant frequency that is high enough, is a convenient way of implementing the method according to the present invention in the sense that the programming effort of the system is reduced.

According to a preferred embodiment, the steps of calculating and selecting are performed more frequently during an early deceleration period than during a late deceleration period. This requires an increase of programming effort. However, this is justified by the fact that during early deceleration periods the change of $\alpha$ over time and the recoverable energy are higher than during late deceleration periods. Therefore it is useful to spend this increased programming effort and also a higher calculation effort during those earlier periods.

Particularly, the steps of calculating and selecting are performed such that the ratio as a function of time matches a predetermined time profile. On this basis, the present invention can be optimized with respect to any desired performance. It is also possible to select the frequency of calculating steps as a function of the motor speed, additionally to or instead of the time dependence.

According to the present invention there is further provided an optical device comprising a power supply and a circuitry that is capable of selectively feeding a current from the power supply into the motor in a first state and from the motor into the power supply in a second state, the device further comprising:

means for decelerating the motor, means for repeatedly calculating a ratio between a duration of the first state and a duration of the second state in dependence on an angular velocity of the motor during decelerating the motor, such that a current integrated over the whole decelerating process is fed from the motor into the power supply, and means for selecting the duration of the first state and the duration of the second state after calculating the ratio, in accordance with the calculated ratio.

Particularly, at least one of the means for decelerating, the means for calculating, and the means for selecting are implemented in a digital signal processor (DSP) that is provided for performing general operation tasks of the optical device.

According to a further embodiment, at least one of the means for decelerating, the means for calculating, and the means for selecting are implemented in a microprocessor that is provided for performing general operation tasks of the optical device.

In this sense, the present invention can be implemented on the basis of components that are existing in prior art optical devices.

This also applies to the preferred embodiment in which the capability of selectively feeding a current from the power supply into the motor in a first state and from the motor into the power supply in a second state is provided by an integrated circuit (IC) using a full H-bridge. An example of a processor using a full H-bridge is the Philips SA56202 processor.

According to the present invention, energy from the turntable motor can be easily recovered by implementing a piece of programming code into existing components of optical disc drives. The motor driver IC has to be selected such that it is driving the motor by using a full H-bridge, hence being capable of feeding current back into its power supply. During the deceleration phase, the voltage applied to the motor is updated in real-time so that it matches a predetermined profile.

These and other aspects of the invention will be apparent from and elucidated with reference to the embodiments described hereinafter.

Figure 1:
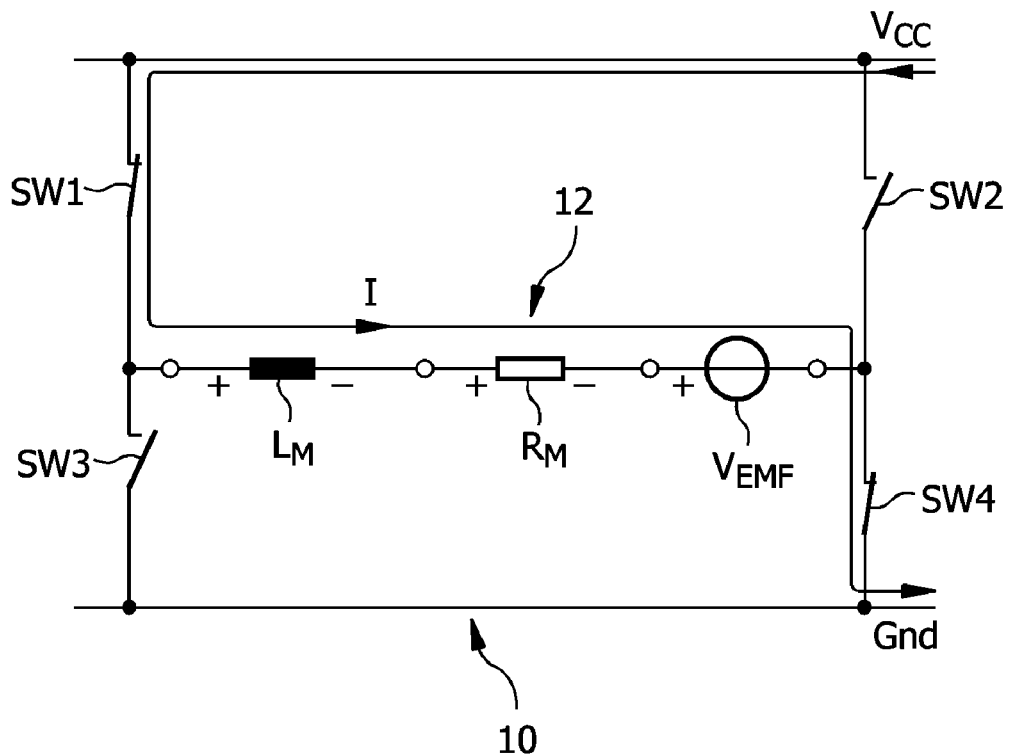
FIG. 1 shows a driving circuit with attached turntable motor in a first switching state for realizing a method according to the present invention.
Figure 2:
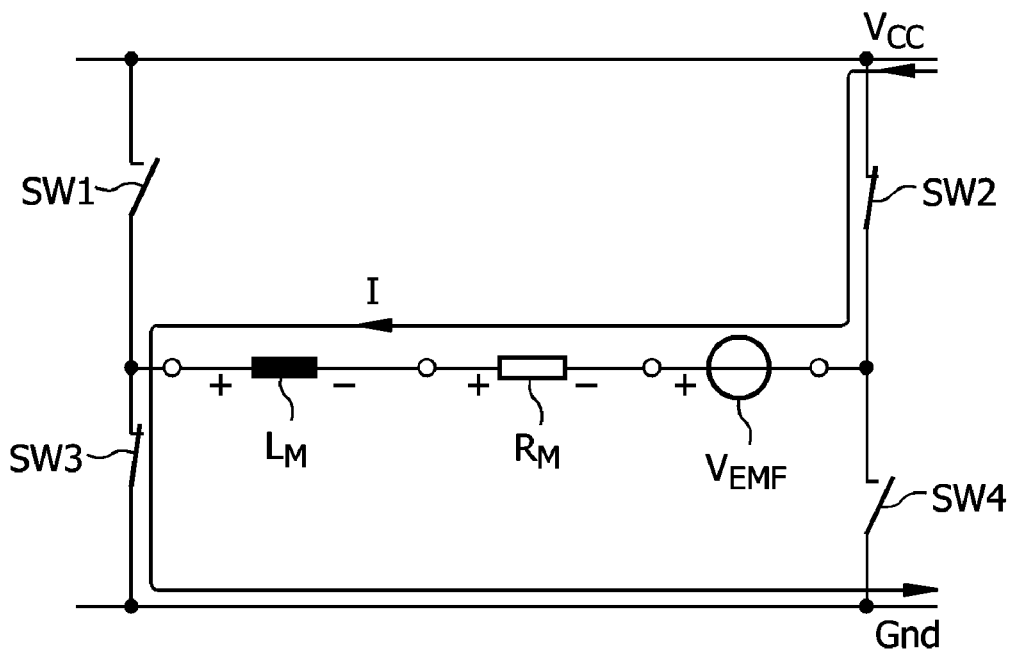
FIG. 2 shows a driving circuit with attached turntable motor in a second switching state for realizing a method according to the present invention.

FIG. 1 shows a driving circuit with attached turntable motor in a first switching state for realizing a method according to the present invention. FIG. 2 shows a driving circuit with attached turntable motor in a second switching state for realizing a method according to the present invention. The invention can be applied to an optical drive that makes use of a switching motor driver. The FIGS. 1 and 2 give a simple model of the driver 10 with the motor 12 attached to it as an example for any operating scheme. The adjustment also works with different schemes. The driver 10 consists of the four switches SW1, SW2, SW3, and SW4 that can be operated in pairs. Either SW1 and SW4 are closed and SW2 and SW3 are open (FIG. 1), or SW1 and SW4 are open and SW2 and SW3 are closed (FIG. 2). Therefore, due to the connection of the supply voltage $V_{CC}$ to ground Gnd, the current I can flow in different directions through the motor 12. The motor 12 is modeled as a self-inductance $L_M$ in series with a resistance $R_M$ and a voltage source $V_{EMF}$ that represents the back-EMF of the motor. When the driver 10 is driving the motor 12, it will periodically switch between the states according to FIG. 1 and FIG. 2. The periodical switching between these states is realized due to the application of a pulse width modulated (PWM) signal to the motor.

In the following, it will be derived, that, in dependence on the duty cycle of the PWM signal, energy from the turntable motor 12 can be recovered during deceleration of the turntable. In this context, the following definitions are used:

T=period time $\alpha$T=the duration of the state according to FIG. 1, $\alpha$=[0,1]

(1-$\alpha$)T=the duration of the state according to FIG. 2, $\alpha$=[0, 1]

The average current, i.e. averaged over one period T, through the motor and flowing out of the power supply will be derived. In the following calculation of the average motor current $I_M$, current through motor flowing from + to − is defined positive. In the state according to FIG. 1 we have:

$$L\frac{dI_M}{dT} = (V_{CC} - V_{EMF} - I_M R_M).$$

In a state according to FIG. 2 we have:

$$L\frac{dI_M}{dT} = -(V_{CC} + V_{EMF} + I_M R_M).$$

Calculating in the steady state, the $\Delta I_M$ in the state according to FIG. 1 will equal $-\Delta I_M$ in the state according to FIG. 2. Thus:

$$\alpha T(V_{CC}-V_{EMF}-I_M R_M)=(1-\alpha)T(V_{CC}+V_{EMF}+I_M R_M).$$

Solving this equation for $I_M$ gives:

$$I_M = -\frac{(1-2\alpha)V_{CC} + V_{EMF}}{R_M} \tag{1}$$

Similarly, the average supply current $I_{PS}$ can be calculated with the convention that current drawn from the power supply is defined as positive. In the state according to FIG. 1 we have:

$I_{PS}=I_M$.

In the state according to FIG. 2 we have:

$I_{PS}=-I_M$.

Averaging over one period T gives:

$$I_{PS} = \frac{\alpha T I_M + (1-\alpha)T(-I_M)}{T} \text{ so}$$

$$I_{PS} = (2\alpha - 1)I_M.$$

Now, $I_M$ in this equation can be substituted by equation (1), which gives:

$$I_{PS} = \frac{4V_{CC}\alpha^2 - (4V_{CC} + 2V_{EMF})\alpha + V_{CC} + V_{EMF}}{R_M} \tag{2}$$

From equation (2) it can be seen that the current drawn from the power supply is a quadratic function that crosses 0 at the following values for α:

$$\alpha_1 = 0.5, \alpha_2 = \frac{V_{CC} + V_{EMF}}{2V_{CC}} \qquad (3)$$

So, with a duty cycle selected between $\alpha_1$ and $\alpha_2$, the motor will feed current back into the power supply.

The minimum of the function represents the α value for which the highest current is fed back to the power supply. This alpha value is called $\alpha_{opt}$.

$$\alpha_{opt} = \frac{2V_{CC} + V_{EMF}}{4V_{CC}} \qquad (4)$$

Figure 3:
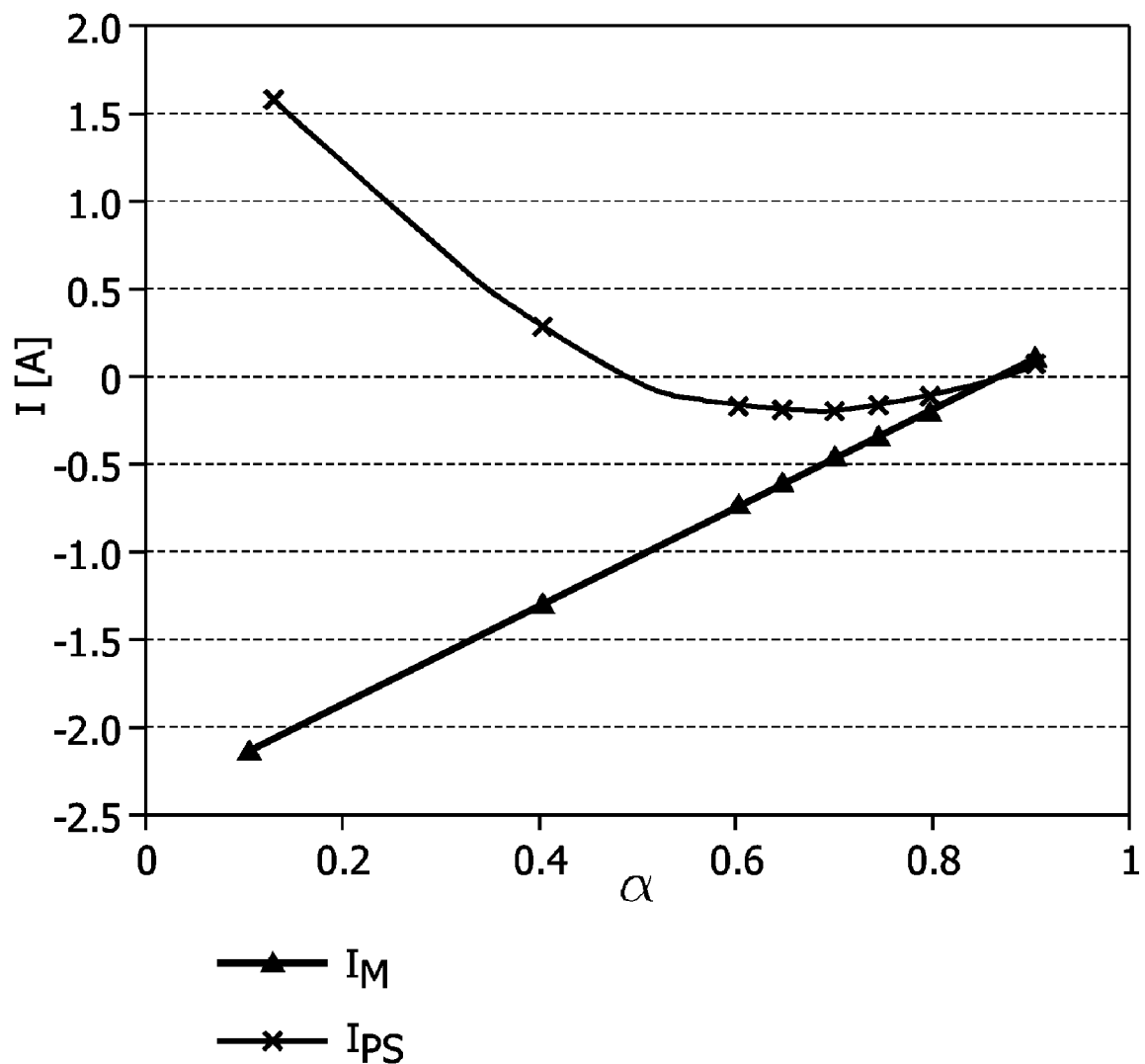
FIG. 3 shows a graph for illustrating the behavior of the motor current $I_M$ and the power supply current $I_{PS}$ in dependence on the duty cycle $\alpha$ for $V_{EMF}>0$.

The calculations presented above are illustrated by the graph according to FIG. 3 that shows the current drawn from the power supply at a given motor speed. This motor speed is chosen such that, as an example, $V_{EMF}$=3.5V. The other parameters are chosen as $R_M$=3.5 Ohm and $V_{CC}$=5V The following characteristic regions in the motor control can be distinguished:

$0 \leq \alpha < 0.5$: the motor is actively braked, requiring drawing a current from the power supply.

$\alpha=0.5$: the motor voltage is zero, which represents a short circuit of the motor coil(s).

$0.5 < \alpha < 0.85$: the motor is actively braked, but a net current is flowing into the power supply.

$\alpha=0.85$: no current is flowing through the motor which represents open motor coil(s).

$\alpha>0.85$: the motor is accelerated, requiring drawing a current from the power supply.

Note that the α=0.85 point changes according to equation (3) when a different motor speed, i.e. a different $V_{EMF}$ is chosen.

From equation (4), and taking into account that $$V_{EMF}=k_M\omega_M$$

wherein $k_M$ represents the motor constant, and $\omega_M$ the angular velocity of the motor, it can be seen that at every motor speed there is an optimum $\alpha_{opt}$ that gives a $I_{PS}\leq 0$. So the next step is to repeatedly calculate this $\alpha_{opt}$ and use these values during the complete deceleration process. The calculation can be performed on a microprocessor or DSP that is used in an optical drive system, for example in the PNX7860 Centaurus2 IC that includes a MIPS processor and a REAL DSP.

Figure 4:
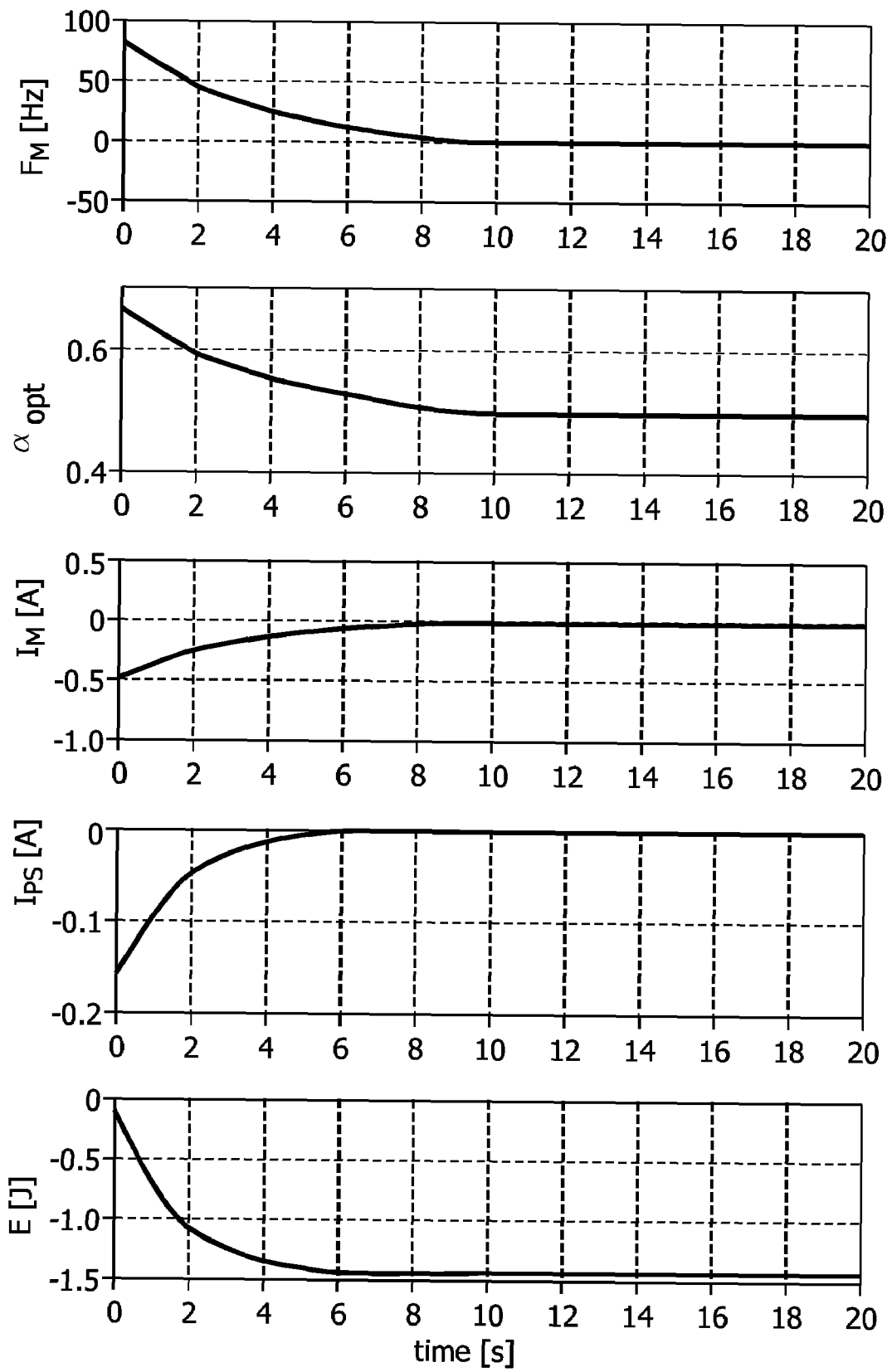
FIG. 4 shows graphs for illustrating the behavior of different quantities during deceleration of the turntable motor for illustrating the present invention.

The graphs according to FIG. 4 show the result of a simulation of this procedure. The motor is decelerated from 80 Hz to 0. The parameters used in the simulation are:

| | |
|---|---|
| $R_M$ = 3.5 Ohm | (coil resistance) |
| $L_M$ = 3.5 mH | (coil self inductance) |
| $k_M$ = 7e-3 Nm/A | (motor constant) |
| $J_M$ = 32e-6 m2kg | (inertia of motor plus 12 cm disc) |
| $T_{fr}$ = $T_{fr}(\omega)$ | (friction) |

From the graphs it can be seen that for this particular situation, 1.45 Joule can be recovered from the motor when braking it from 80 Hz to 0. The mechanical energy in the motor when it was spinning at 80 Hz was E=½J$\omega^2$=4J. So about 36% of the mechanical energy can be recovered. The rest is dissipated in the coil resistance, and dissipated because of friction.

Figure 5:
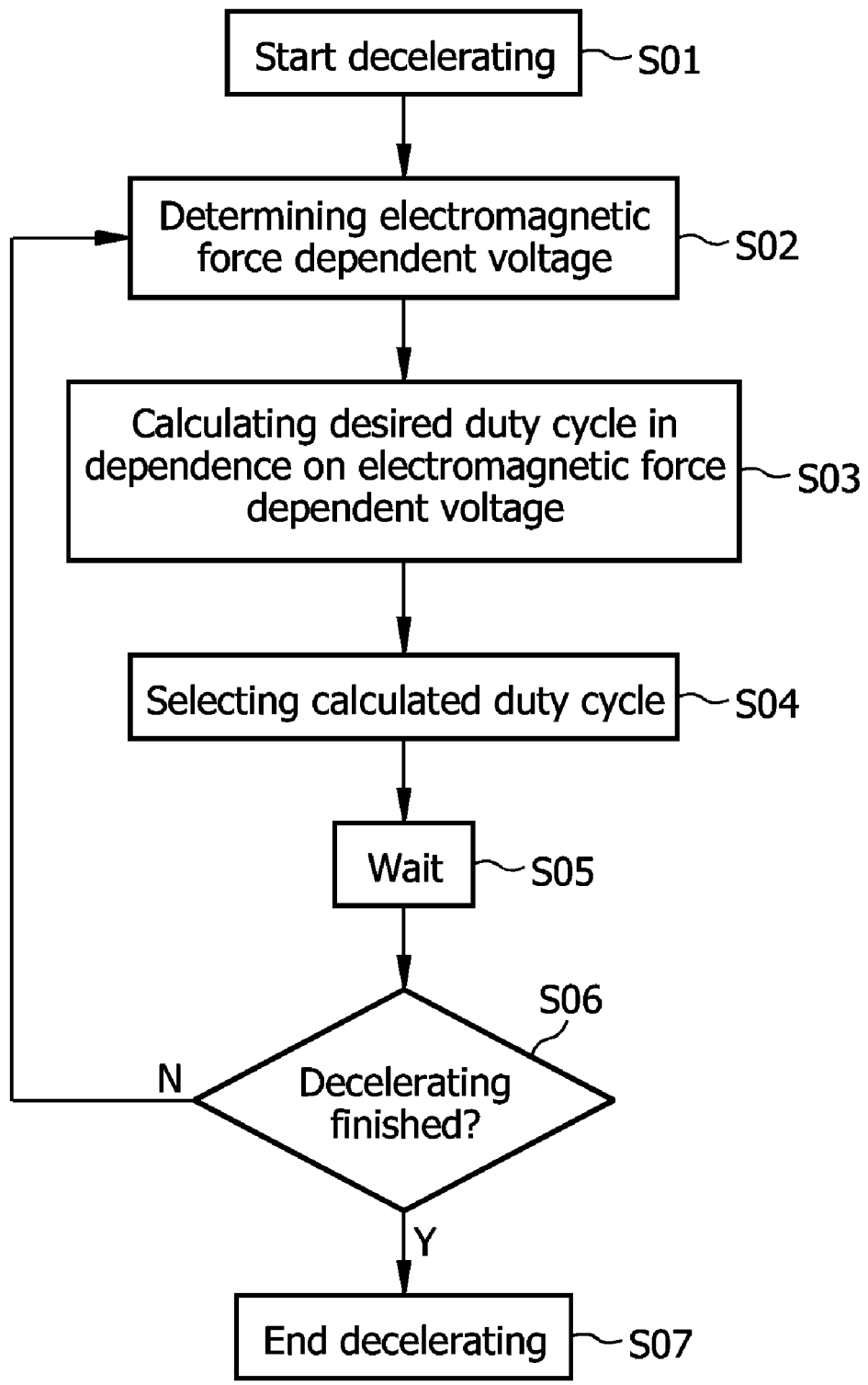
FIG. 5 shows a flow chart for illustrating a method according to the present invention.

FIG. 5 shows a flow chart for illustrating a method according to the present invention. In a first step S01 the decelerating is started. During the deceleration, the electromagnetic force dependent voltage $V_{EMF}$ is determined on the basis of the angular velocity $\omega_M$ and the motor constant $K_M$ according to step S02. In step S03 the desired duty cycle in dependence on the electromagnetic force dependent voltage is calculated by using the equation $$\alpha_{opt} = \frac{2V_{CC} + V_{EMF}}{4V_{CC}}.$$

According to step S04, the calculated duty cycle is selected for the application of the pulse width modulated signal. Step S05 is a waiting step, the waiting time being constant or variable, that can be present if calculation effort is to be saved. In the absence of the waiting step the adjustment of α can be quasi-continuous.

In step S06 it is judged whether the decelerating is to be finished. If this is not the case, the process continues in step S02 with determining the electromagnetic force dependent voltage. If the deceleration is to be finished, the method ends in step S07.

The present invention can be applied in many technical fields. A particular area of interest is that of optical drives for portable equipment such as notebook computers or portable AV devices that use a switching motor driver that allows current flowing back to the power supply. An example of a application that could use the invention is a future "blue" notebook drive. Because the mechanical energy in the motor plus disc is relatively small as compared to the energy dissipated in the total drive the invention is most valuable in applications that perform many spin-up/spin-down actions and relatively short sequential read/write actions.

Equivalents and modifications not described above may also be employed without departing from the scope of the invention, which is defined in the accompanying claims.

The invention claimed is:

1. A method of recovering energy from the turntable motor (12) in an optical disc drive comprising a power supply and a circuitry (10) that is capable of selectively feeding a current from the power supply into the motor in a first state and from the motor into the power supply in a second state, the method comprising the steps of:

decelerating the motor, during decelerating the motor, repeatedly calculating a ratio between a duration of the first state and a duration of the second state in dependence on an angular velocity of the motor, such that a current integrated over the whole decelerating process is fed from the motor into the power supply, and after calculating the ratio, selecting the duration of the first state and the duration of the second state in accordance with the calculated ratio.

2. The method according to claim 1, wherein the ratio is defined as $\alpha/(1-\alpha)$ and an optimum value $\alpha_{opt}$ for α is calculated in accordance with the equation $$\alpha_{opt} = \frac{2V_{CC} + V_{EMF}}{4V_{CC}}$$

wherein $V_{CC}$ is the power supply voltage and $V_{EMF}$ is an electromagnetic force dependent voltage depending on the angular velocity $\omega_M$ of the motor and the motor constant $k_M$ in accordance with the equation $V_{EMF} = k_M \omega_M$.

3. The method according to claim 1, wherein the duration of the first state and the duration of the second state is selected by selecting a corresponding pulse width modulation (PWM) signal that is applied to the motor.

4. The method according to claim 1, wherein the steps of calculating and selecting are performed with a constant frequency over the whole deceleration process.

5. The method according to claim 1, wherein the steps of calculating and selecting are performed more frequently during an early deceleration period than during a late deceleration period.

6. The method according to claim 1, wherein the steps of calculating and selecting are performed such that the ratio as a function of time matches a predetermined time profile.

7. An optical device comprising a power supply and a circuitry (10) that is capable of selectively feeding a current from the power supply into the motor (12) in a first state and from the motor into the power supply in a second state, the device further comprising:

means for decelerating the motor, means for repeatedly calculating a ratio between a duration of the first state and a duration of the second state in dependence on an angular velocity of the motor during decelerating the motor, such that a current integrated over the whole decelerating process is fed from the motor into the power supply, and means for selecting the duration of the first state and the duration of the second state after calculating the ratio, in accordance with the calculated ratio.

8. The optical device according to claim 7, wherein at least one of the means for decelerating, the means for calculating, and the means for selecting are implemented in a digital signal processor (DSP) that is provided for performing general operation tasks of the optical device.

9. The optical device according to claim 7, wherein at least one of the means for decelerating, the means for calculating, and the means for selecting are implemented in a microprocessor that is provided for performing general operation tasks of the optical device.

10. The optical device according to claim 7, wherein the capability of selectively feeding a current from the power supply into the motor in a first state and from the motor into the power supply in a second state is provided by an integrated circuit (IC) using a full H-bridge.

\* \* \* \* \*